Dec. 22, 1936.  W. S. PROUDFIT  2,065,153
CASTING ROD ATTACHMENT
Filed Dec. 16, 1935
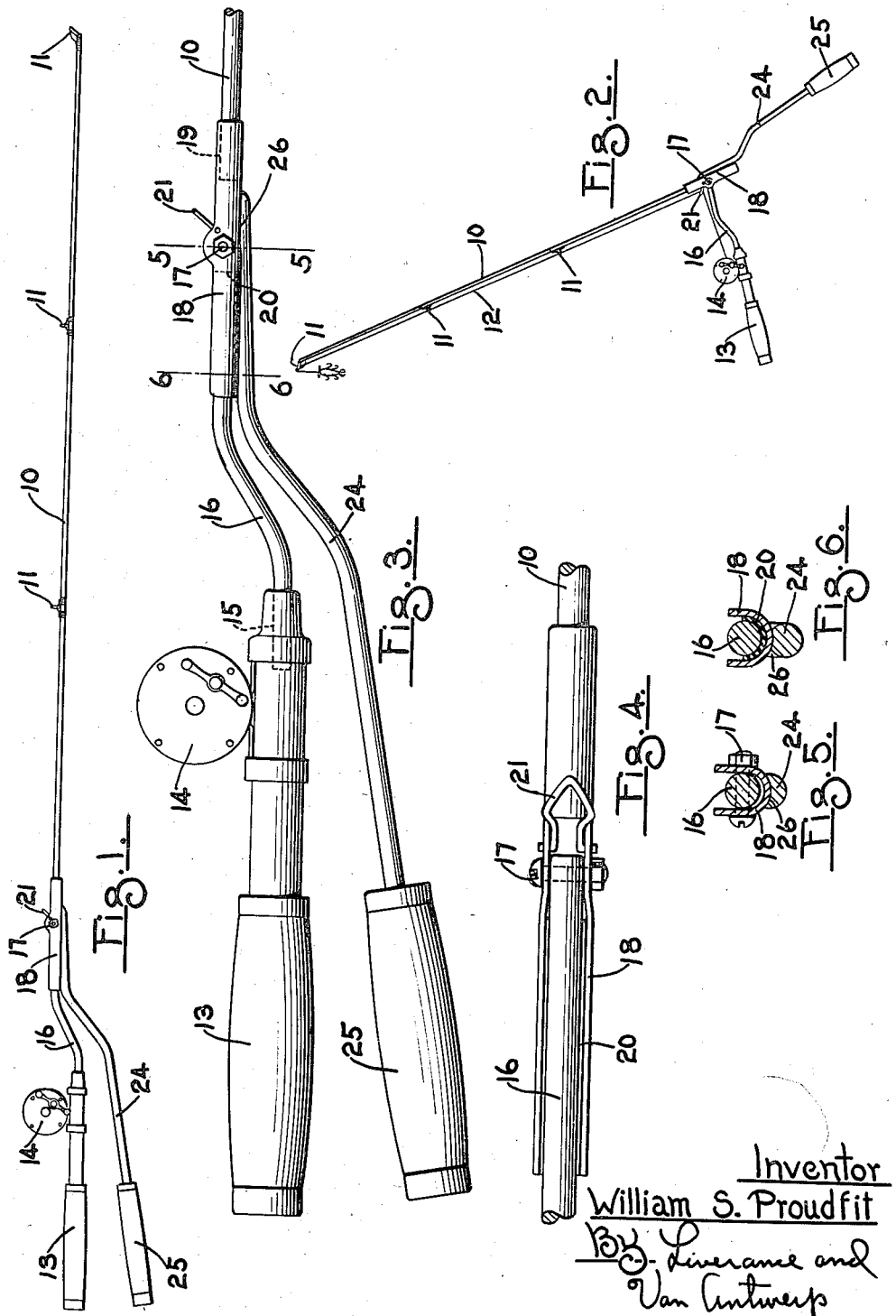
Inventor
William S. Proudfit
By Liverance and
Van Antwerp
Attorneys Patented Dec. 22, 1936

2,065,153

UNITED STATES PATENT OFFICE 2,065,153

CASTING ROD ATTACHMENT

William S. Proudfit, Grand Rapids, Mich.

Application December 16, 1935, Serial No. 54,540

9 Claims. (Cl. 43—25)

This invention relates to a fishing tackle and more particularly to a casting rod.

One advantage resides in its construction whereby a much greater leverage can be obtained than with the ordinary rod and consequently the bait can be thrown more forcibly and will travel further. This leverage is obtained by the addition of a second handle member, as will be later explained in more detail, whereby a moving pivot is provided about which the rod is turned. Thus the rod has a turning movement and also a bodily movement which gives the increased leverage.

Another advantage resides in the double handle construction whereby the twist of the rod is controlled and thus the bait is more fully controlled than in ordinary casting. The double handle members also permit the point of the rod to be positioned and controlled to a very exact degree and thus the bait may be thrown at exactly the desired angle.

Another advantage is that my improved fishing and casting rod is easily and simply made whereby economy of manufacture is obtained. Also, the device may be made as an attachment for the ordinary casting rod, the construction being such as to permit easy attachment or detachment thereof.

Another feature lies in the easy action of the construction, the hands of the fisherman moving toward one another during the casting operation.

Another feature is my removable eye member which permits the ready insertion of the fishing line therethrough, this facilitating the attaching or detaching of my device to an ordinary rod.

Another feature of my rod is that it can be expediently used for baiting the hook and landing the fish by separating the handles to approximately 90 degrees.

Another feature or advantage is the offset construction of the device whereby the reel is positioned so as to position the fishing line in direct alinement throughout the length of the pole.

Yet another feature is my rubber bumper means which prevents contact between the handles.

Still further objects or advantages subsidiary or incidental to the aforesaid objects, or resulting from the construction or operation of the invention as it may be carried into effect, will become apparent as the said invention is hereinafter further disclosed.

In the drawing:

Fig. 1 is a side view of my invention as embodied in a casting rod;

Fig. 2 shows the rod in a position before casting.

Fig. 3 is an enlarged view of the left hand portion of Fig. 1.

Fig. 4 is a plan view showing particularly the pivotal connection between the handle member and the rod proper.

Fig. 5 is a sectional view taken along the line 5—5 of Fig. 3.

Fig. 6 is a sectional view taken along the line 6—6 of Fig. 3.

Like numerals refer to like parts throughout the several views.

Referring now to Figs. 1 and 2, numeral 10 indicates the rod proper, having suitable line receiving eyes 11 for the line 12, and 13 indicates the auxiliary handle member. The auxiliary handle member, see Fig. 3, carries a reel 14 at its front end.

As shown in dotted lines in Fig. 3, the auxiliary handle 13 has a socket opening 15 which can receive the butt end of the rod 10 in order to form an ordinary fishing pole.

My improved device or attachment consists of a body member having a curved extension 16 adapted to be received in the socket 15. The other end of this curved member 16 is pivoted at 17 into the shell 18. This shell 18 is of U-shaped construction at one end and has a socket member 19 at its other end. This socket 19 is of the same size as the socket 15 and receives the pole 10 therein.

A rubber bumper member 20, see Fig. 6, is positioned between the member 16 and the U-shaped shell 18. Also, the detachable eye construction 21 is pivoted to the body member 18 as shown in Figs. 3 and 4.

A rod element 24, terminating in a second handle member 25, is welded at 26 onto the member 18.

The operation and use of my device will be easily understood by the sportsman. The device is positioned as shown in Fig. 2 immediately prior to casting and by proper closing movement of his hands the fisherman rotates the point of the rod outwardly and downwardly and simultaneously moves the pivot to the right as shown in this figure. Thus the rod 10 turns about the pivot 17 and the pivot 17 moves through an arc thus lending additional speed to the tip of the casting pole.

Alinement of the direction of the movement is easily secured by utilizing handle 25 as a sighting element.

The nature and scope of the invention are set forth in the above specification, taken with the drawing, showing the construction in which the principle of my invention is embodied; and the novel features thereof are specified in the appended claims. But this disclosure is explanatory only and I may in practice vary the structural details actually shown, without departing from the spirit of the invention, to the full extent indicated by the broad and general meaning of the terms in which the appended claims are expressed.

I claim:

1. A casting rod having a handle rigid therewith, a rod element pivoted intermediately onto the rod and an auxiliary handle located on said rod element, said rod element and auxiliary handle being swingable to a position substantially alongside of the rigid handle.

2. A casting rod as recited in claim 1 in which the rigid handle is offset toward the auxiliary handle.

3. A casting rod as recited in claim 1 in which the rigid handle is offset toward the auxiliary handle and rubber bumper means provided adjacent the pivotal joint whereby contact between the handles is prevented.

4. A fishing and casting rod of the class described consisting of a straight pole having line receiving eyelets thereon, a handle, a body member detachably receiving the pole and attached to the handle to hold them in predetermined relationship, and a second auxiliary handle pivotally mounted upon the said body member.

5. A fishing and casting rod as set forth in claim 4 in which said second auxiliary handle is swingable to a position adjacent to the first mentioned handle.

6. A fishing and casting rod as set forth in claim 4 in which said second auxiliary handle is swingable to a position adjacent to the first mentioned handle but is maintained slightly therefrom by rubber means.

7. An attachment for a fishing rod having a detachable handle comprising a body member having a socket adapted to receive the butt end of the detached rod and an extension slidable into the detached handle, and a second auxiliary handle pivoted onto the said body member.

8. A casting rod comprising, two parts pivotally connected to each other, one part carrying a reel and the other part having line guiding means and a handle member rigidly attached to said part having the line guiding means and extending away from said pivotal connection.

9. A casting rod having a handle rigid therewith, and an auxiliary handle pivoted intermediately onto the rod, said auxiliary handle being swingable from a position alongside of the rigid handle to a position beyond 90° therefrom.

WILLIAM S. PROUDFIT.